(12) United States Patent
Arteta Unanua

(10) Patent No.: US 11,530,715 B2
(45) Date of Patent: Dec. 20, 2022

(54) FASTENER

(71) Applicant: ILLINOIS TOOL WORKS INC., Glenview, IL (US)

(72) Inventor: Javier Arteta Unanua, Puente la Reina (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/343,928

(22) Filed: Jun. 10, 2021

(65) Prior Publication Data

US 2021/0396254 A1  Dec. 23, 2021

(30) Foreign Application Priority Data

Jun. 23, 2020 (EP) .................................... 20382547
May 5, 2021 (EP) .................................... 21172265

(51) Int. Cl.
*F16B 5/06* (2006.01)
*F16B 5/02* (2006.01)

(52) U.S. Cl.
CPC ............ *F16B 5/065* (2013.01); *F16B 5/0208* (2013.01); *F16B 5/0635* (2013.01); *F16B 5/0657* (2013.01)

(58) Field of Classification Search
CPC ...... F16B 5/065; F16B 5/0208; F16B 5/0635; F16B 5/0657; F16B 37/044; F16B 5/0621; F16B 5/02; F16B 39/22
See application file for complete search history.

(56) References Cited

U.S. PATENT DOCUMENTS

| | | | | |
|---|---|---|---|---|
| 3,145,753 A | * | 8/1964 | Kreider ................. | F16B 37/041 411/970 |
| 3,186,981 A | * | 6/1965 | De Ronde .............. | H01H 9/286 200/318 |
| 3,669,170 A | * | 6/1972 | Schuster ............... | F16B 37/041 411/970 |
| 5,039,264 A | * | 8/1991 | Benn ..................... | F16B 37/041 411/523 |
| 6,474,917 B2 | * | 11/2002 | Gauron ................. | F16B 37/043 |
| 6,688,825 B1 | * | 2/2004 | Stewart ................. | F16B 37/044 411/174 |

(Continued)

FOREIGN PATENT DOCUMENTS

DE 102004017449 A1 10/2005
WO WO 0198033 A2 12/2001

*Primary Examiner* — David M Upchurch
(74) *Attorney, Agent, or Firm* — Thompson Hine LLP

(57) ABSTRACT

A fastener includes a base member; a first member, on the base member and having a through bore; a second member, on the base member and spaced from the first member to form a receiving portion to receive a panel structure, including an aperture defining an internal surface, the internal surface including at least one stop member protruding radially inwardly, and a nut member, coaxially aligned within and frangibly connected to the internal surface, including at least one block member protruding radially outward from an outer surface of the nut member to stoppingly engage with the at least one stop member. During use, the nut member moves from a first position, where the nut is frangibly connected to the internal surface, to a second position, where the least one block member abuttingly engages with the at last one stop member.

11 Claims, 9 Drawing Sheets

(56) References Cited

U.S. PATENT DOCUMENTS

| | | | | |
|---|---|---|---|---|
| 6,854,941 B2* | 2/2005 | Csik | ............... | F16B 37/044 |
| | | | | 411/111 |
| 6,918,725 B2* | 7/2005 | Gauron | ............ | F16B 37/043 |
| | | | | 411/112 |
| 6,971,830 B2* | 12/2005 | Hulin | ............ | F16B 5/0635 |
| | | | | 411/184 |
| 7,648,319 B1* | 1/2010 | Ochoa | ............ | F16B 37/044 |
| | | | | 411/174 |
| 8,231,317 B2* | 7/2012 | De Gelis | ......... | F16B 5/0266 |
| | | | | 411/188 |
| 9,267,529 B2* | 2/2016 | Tejero Salinero | .... | F16B 37/041 |
| 10,473,139 B2* | 11/2019 | Costabel | ......... | F16B 37/044 |
| 2002/0119026 A1* | 8/2002 | Gauron | ............ | F16B 37/044 |
| | | | | 411/112 |
| 2009/0285648 A1* | 11/2009 | Gosis | ............ | B60R 21/20 |
| | | | | 411/22 |
| 2009/0285651 A1* | 11/2009 | Cooley | ......... | B29C 45/2618 |
| | | | | 411/106 |
| 2013/0189048 A1* | 7/2013 | Kato | ............ | F16B 5/0635 |
| | | | | 411/22 |
| 2015/0033511 A1* | 2/2015 | Nakazato | ............ | F16B 5/10 |
| | | | | 24/351 |
| 2018/0094670 A1* | 4/2018 | Costabel | ............ | F16B 5/01 |
| 2018/0094671 A1* | 4/2018 | Costabel | ............ | F16B 37/043 |
| 2018/0222429 A1* | 8/2018 | Marini | ............ | F16B 2/08 |

* cited by examiner

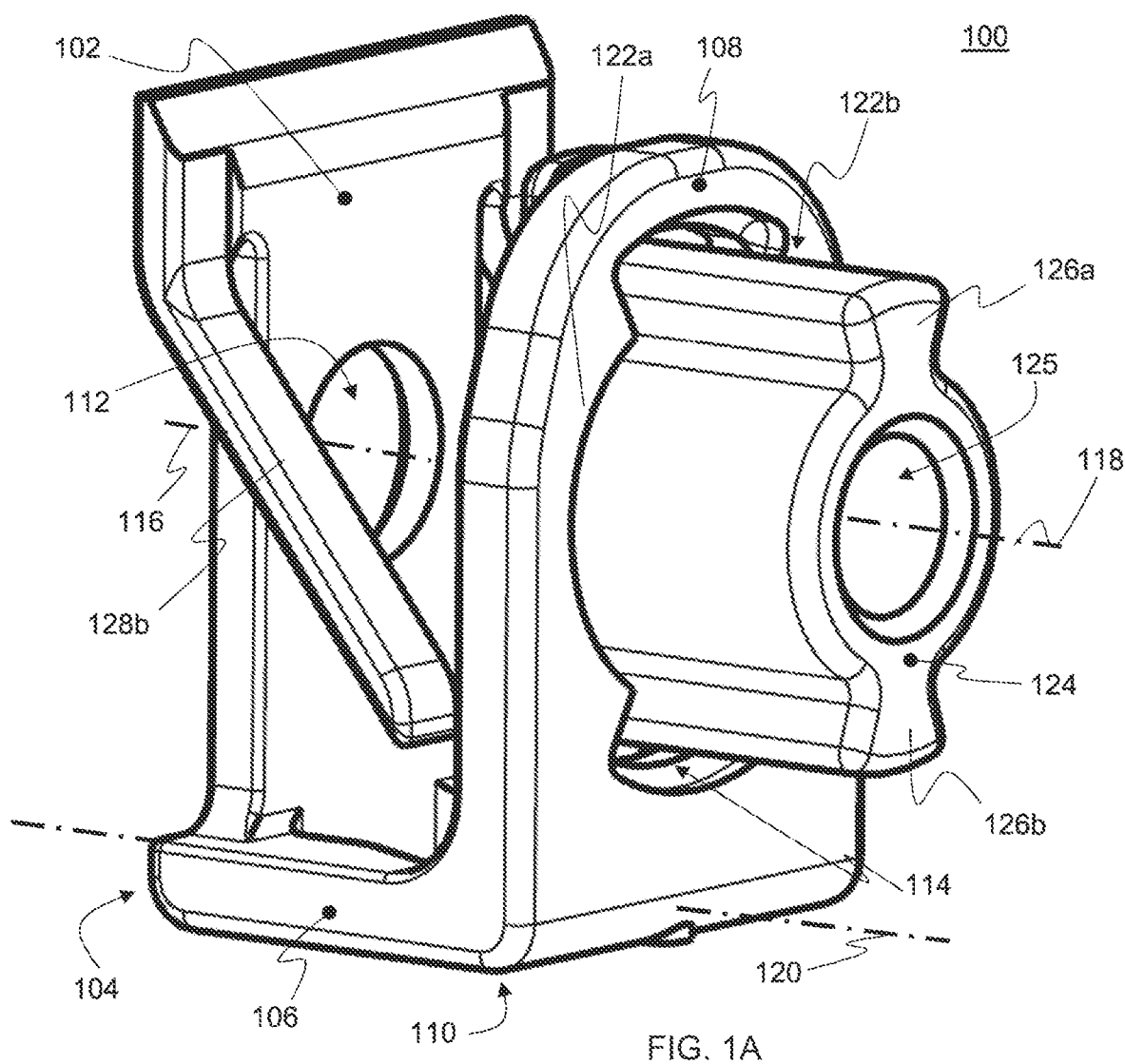
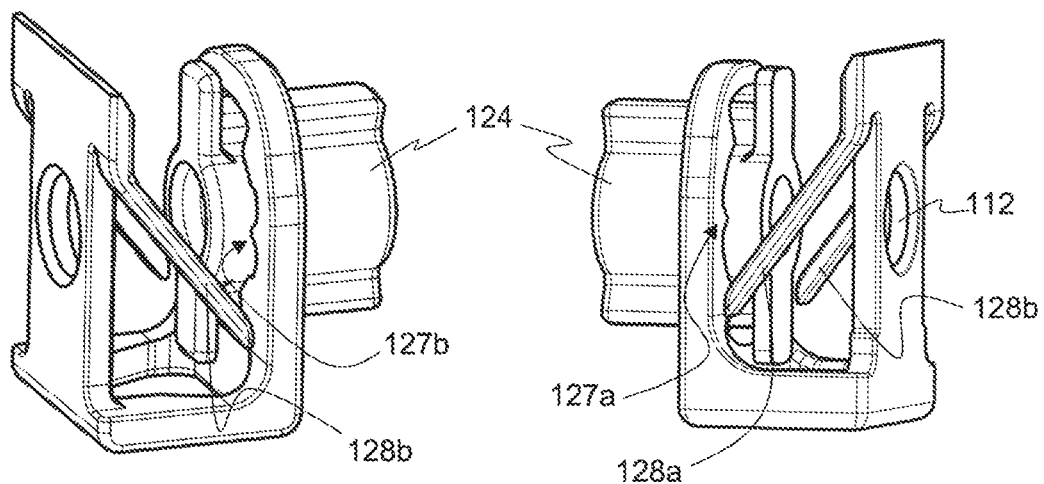
FIG. 1A
FIG. 1B
FIG. 1C

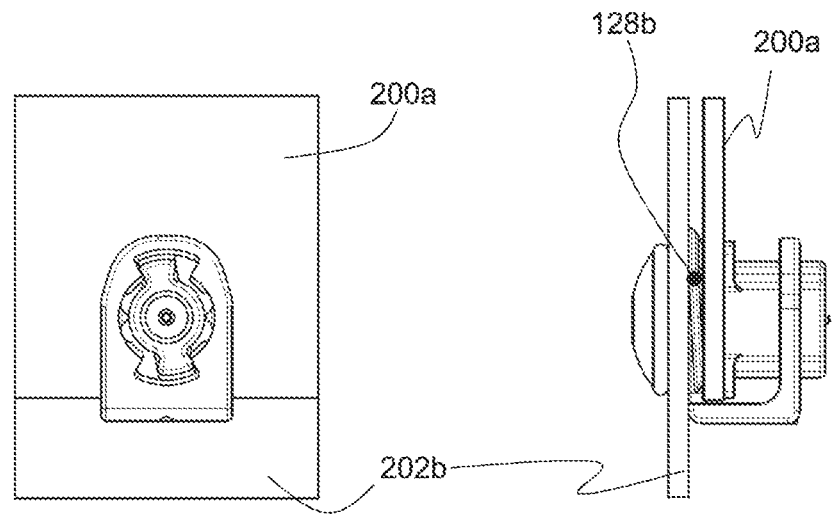
FIG. 5A
FIG. 5B
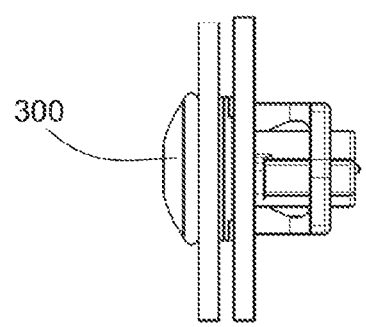
FIG. 5C

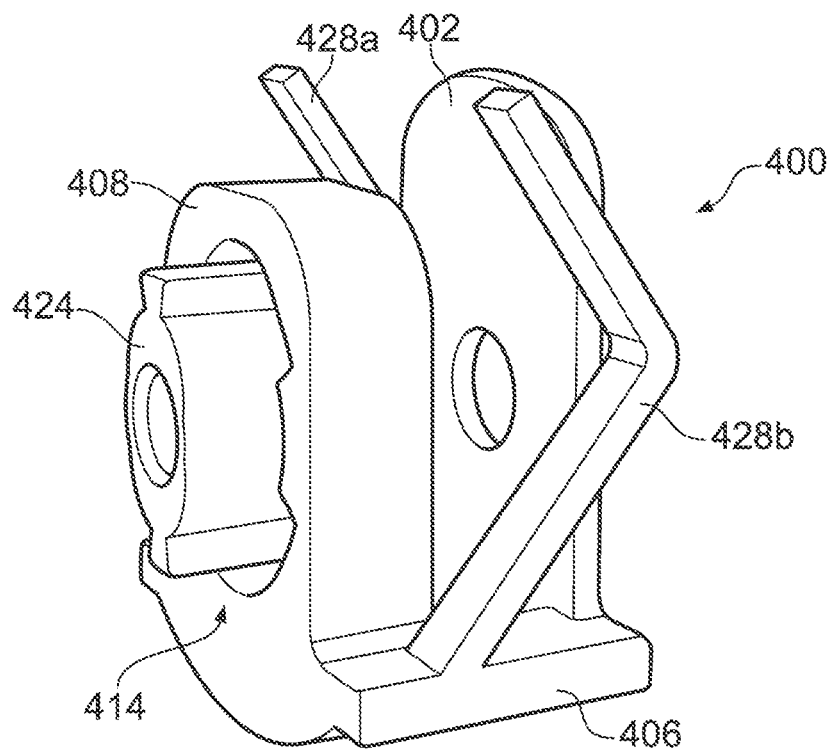
FIG. 6A
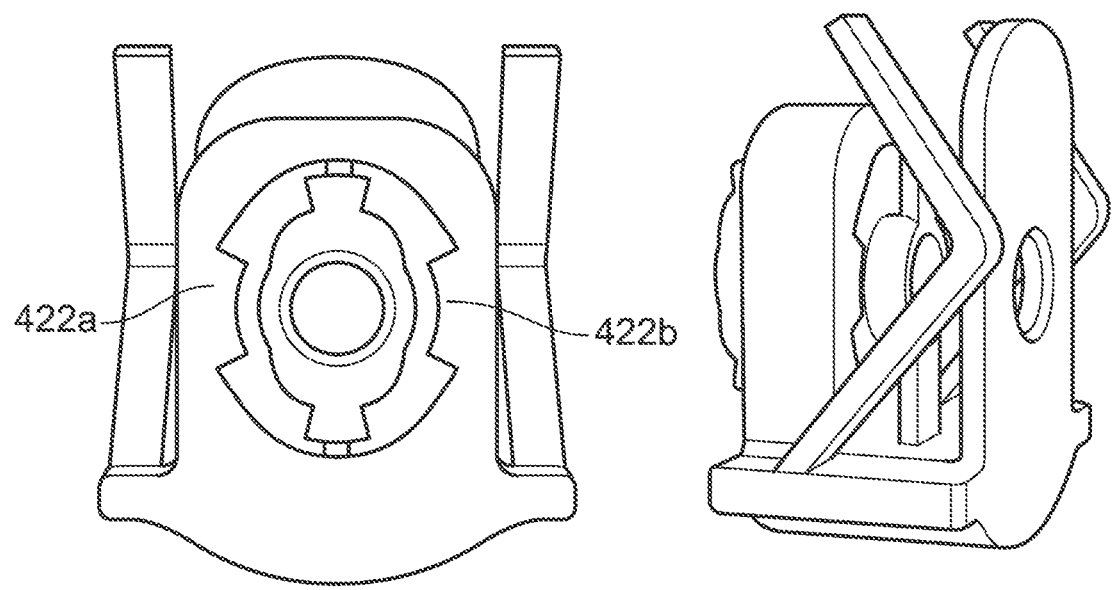
FIG. 6B
FIG. 6C

FASTENER

TECHNICAL FIELD

The present invention relates to a fastener, in particular a fastener that may be used with, a screw, to attach two structural parts, for example two panels of a vehicle.

BACKGROUND

Such fasteners are used to attach components of, for example, a vehicle. There are many forms of fasteners, often these fasteners are complex to use and complex to manufacture.

Typically, such fasteners are made of metal, and are of a complex design. Fasteners made from metal also tend to make the fastener relatively heavy, which can lead to problems in use. Thus, such metal fasteners can be expensive to manufacture. The prior art fasteners also tend to be limited to what size panels can be attached, and therefore are limited in use to what these fasteners can be used for. Thus, often a number of different types of fasteners are required to be used, adding to the complexity of manufacture, time, and cost, for example in the manufacture of a vehicle.

Proceeding from the prior art it is an object of the present invention to address some of the problems associated with the prior art fasteners. It is an object of the present invention to provide an easy to use fastener. It is an object of the present invention to provide a fastener that is easy to manufacture.

SUMMARY

An aspect of the invention is set out in the independent claim. Dependent claims describe optional features.

In one aspect of the invention there is provided a fastener for coupling two panel structures, comprising:
a base member, having a proximal end portion and a distal end portion extending along a longitudinal axis;
a first member, provided on said base member towards said proximal end portion, said first member comprising a through bore having a first central axis that is parallel to said longitudinal axis;
a second member, provided on said base member towards said distal end portion and spaced apart from said first member so as to form a receiving portion configured to receive at least one panel structure, comprising an aperture defining an internal surface and having a second central axis that is coaxially aligned with said first central axis, said internal surface comprising at least one stop member protruding radially inwardly from said internal surface, and
a nut member, coaxially aligned within and frangibly connected to said internal surface of said aperture, comprising at least one block member protruding radially outward from an outer surface of said nut member and configured to stoppingly engage with said at least one stop member, and
wherein, during use, said nut member is configured to move from a first position, where said nut is frangibly connected to said internal surface, to a second position, where said at least one block member is abuttingly engaged with said at last one stop member so as to allow axial movement of said nut member within said aperture of said second member.

This provides the advantage that the fastener of the present invention is simple to use and simple to manufacture, having few parts but still able to give a reliable attachment. Having few parts may allow a fastener of less weight to be manufactured. Having few parts and being easy to manufacture may allow manufacturing to be less costly than previously. The configuration of the present invention also has the advantage that panels of varying sizes may be attached. Therefore, the present fastener may be used to attach panels of a wide range of panel thicknesses. The panels being attached may be different thicknesses. Therefore, the fasteners of the present invention can be more widely used, lessening the need for fasteners of other types to be used.

Advantageously, said first member and said second member may be arranged perpendicular to said longitudinal axis of said base member.

Advantageously, said nut member may be configured to rotate from said first position to said second position.

Advantageously, said fastener may further comprise at least one resilient leg provided on any one of said base member, said first member and said second member and that is arranged laterally with respect to said longitudinal axis and extending into said receiving portion, and configured to biasingly engage with a panel structure received in said receiving portion.

Preferably, said fastener may comprise at least two resilient legs each one arranged laterally with respect to said longitudinal axis on opposing sides of said base portion.

Advantageously, said fastener may be made from integrally molded plastic.

Preferably, said nut member may comprise a central threaded bore configured for operably engage with a screw.

Advantageously, said internal surface may comprise at least two radially opposing stop members each one protruding radially inwardly from said internal surface.

Advantageously, said nut member may comprise at least two block members each one protruding radially outward from said outer surface of said nut member and configured to stoppingly engage with a respective one of said at least two stop members. Preferably, said at least two block members may be arranged radially opposite to each other.

BRIEF DESCRIPTION OF THE DRAWINGS

An exemplary embodiment of the invention is explained in more detail hereinbelow with reference to the figures:

FIGS. 1A-1C show an example embodiment of a fastener of the present invention, FIG. 1A in a perspective rear left-side view, FIG. 1B in a perspective front left-side view and FIG. 1C in a perspective front right-side view;

FIGS. 5A-5C show the panel structures and coupled fastener of FIGS. 4A-4B, FIG. 5A in a rear view, FIG. 5B in a side-view and FIG. 5C in a top-view;

FIGS. 6A-6C show an alternative example embodiment of the fastener of the present invention, FIG. 6A in a perspective rear side-view, FIG. 6B a rear-view and FIG. 6C in a perspective front side-view;

DETAILED DESCRIPTION

Figures 2A, 2B:
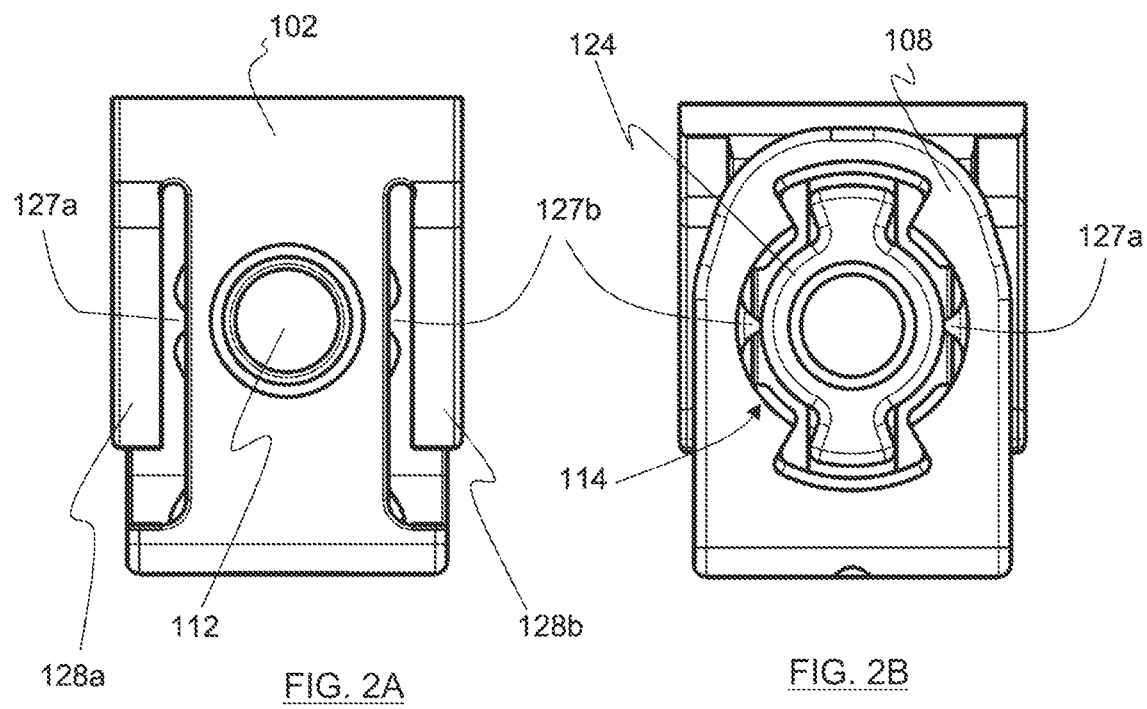
FIGS. 2A-2D show the example embodiment of the fastener of FIGS. 1A-1C, FIG. 2A in a front view, FIG. 2B in a back view, FIG. 2C in a side view and FIG. 2D in a top view.
Figures 2C, 2D:
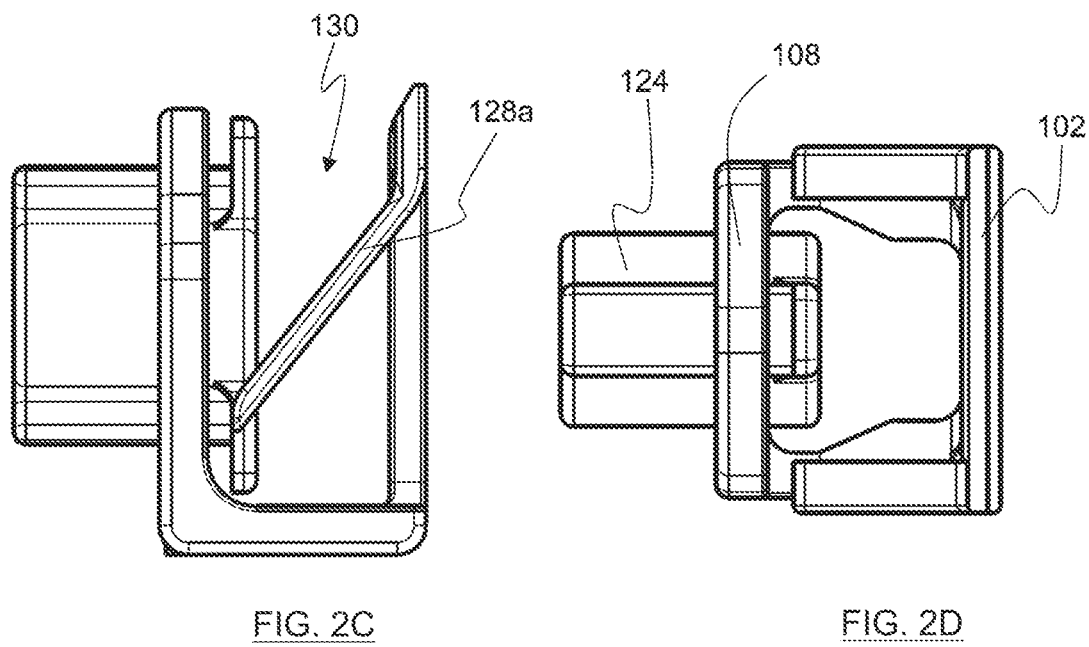
Figure 3A:
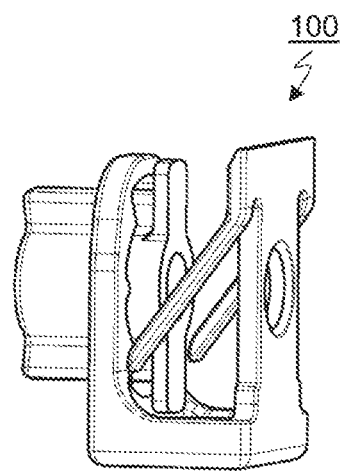
FIGS. 3A-3H show a sequence of perspective front- and rear-views of attaching the fastener of FIGS. 1A-1C to two panel structures utilising a screw.
Figure 3B:
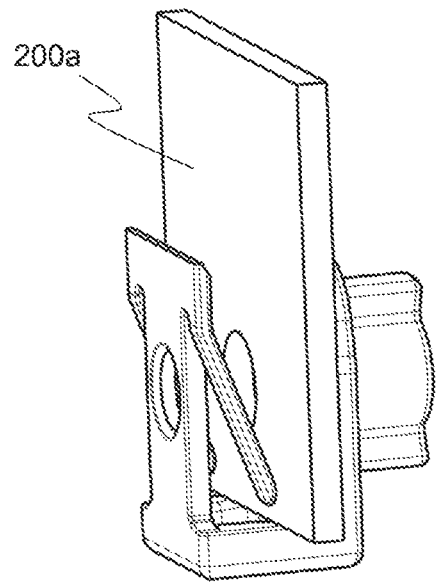
Figure 3C:
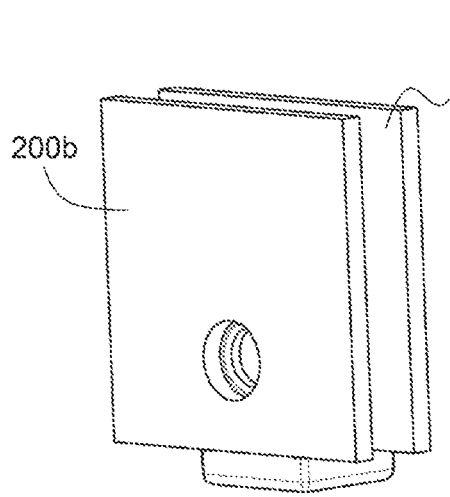
Figure 3D:
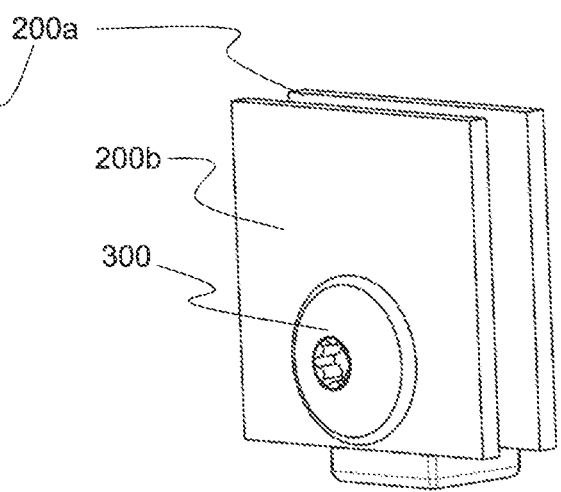
Figure 3E:
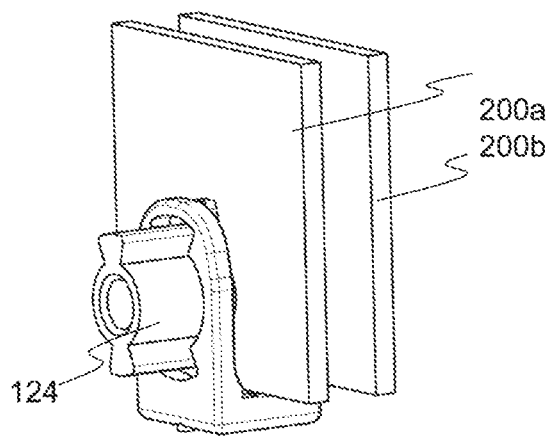
Figure 3F:
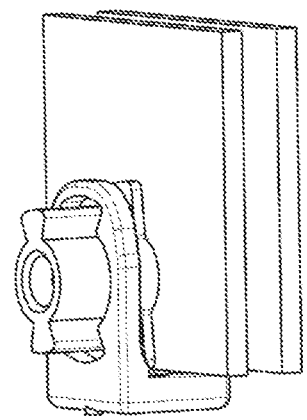
Figure 3G:
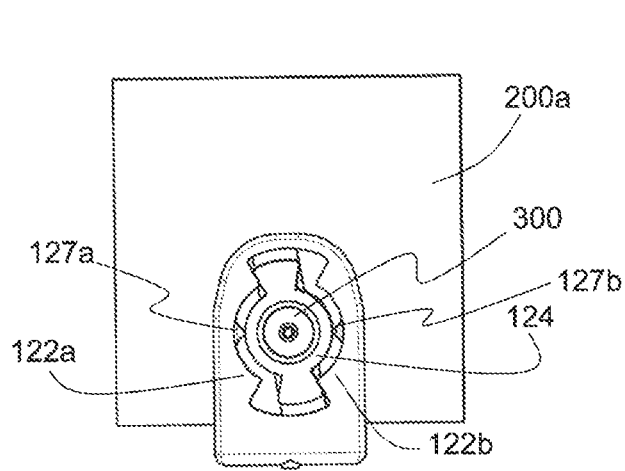
Figure 3H:
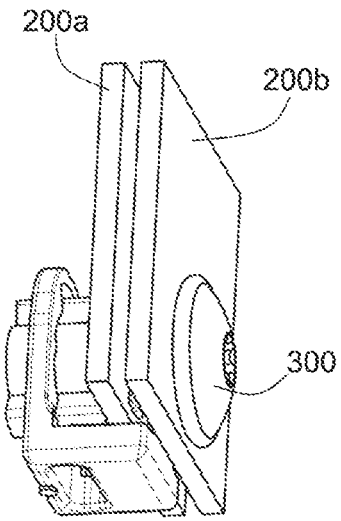
Figure 4A:
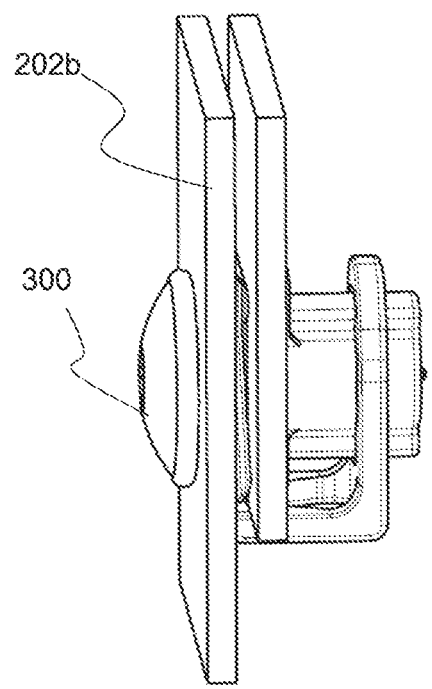
FIGS. 4A and 4B show views of the fastener of FIGS. 1A-1C when coupled to two different panel structures.
Figure 4B:
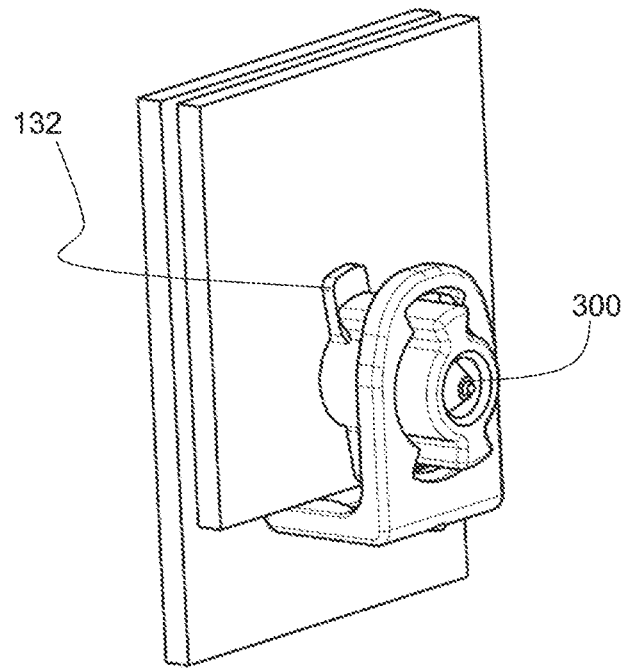
Figure 7A:
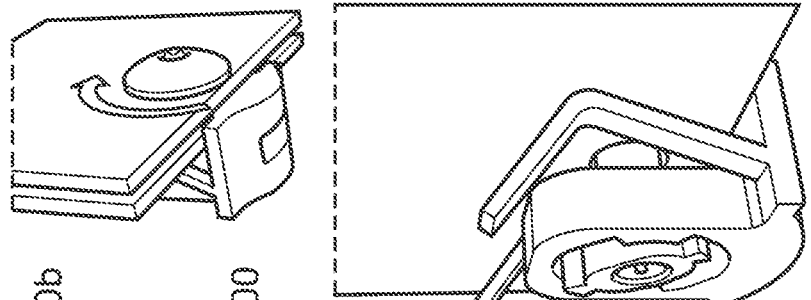
FIGS. 7A-7D show a sequence of perspective front-views and rear-views of attaching the fastener of FIGS. 6A-6C to two panel structures utilising a screw.
Figure 7B:
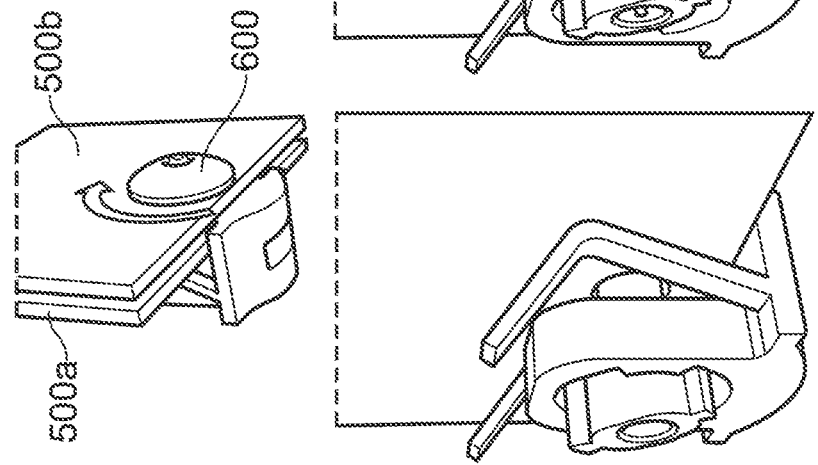
Figure 7C:
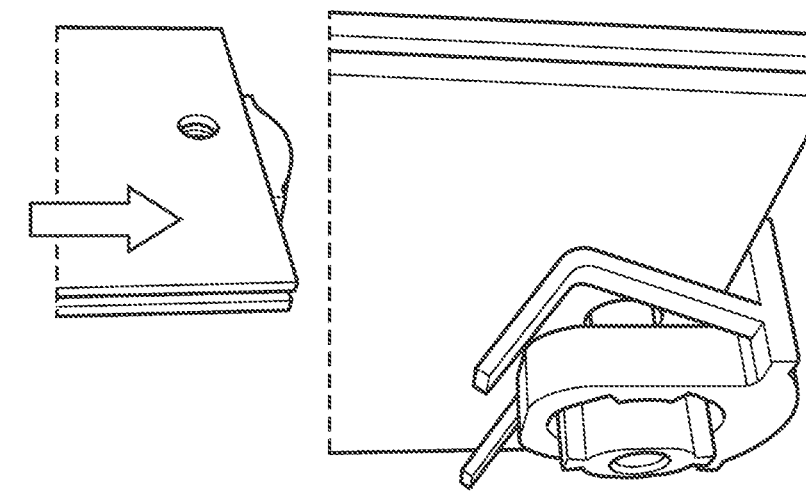
Figure 7D:
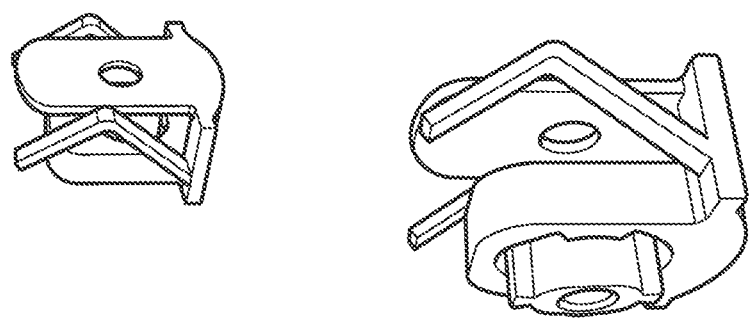

Certain terminology is used in the following description for convenience only and is not limiting. The words 'upper' and 'lower' and designate directions in the drawings to which reference is made and are with respect to the described component when assembled and mounted. The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, 'first', 'second', 'third' etc. merely indicate that different instances of like objects are being referred to and are not intended to imply that the objects so described must be in a given sequence, either temporally, spatially, in ranking or in any other manner. Like reference numerals are used to depict like features throughout.

Referring now to FIGS. 1A to 1C and FIG. 2A to 2D different perspective views, as well as, a standard front, rear, side and top view are shown of a first example embodiment of the fastener 100 of the present invention. The fastener 100 comprises, inter alia, a first member 102 arranged at the proximal end 104 of a base member 106, and a second member 108 arranged at a distal end 110 of the base member 106. The first member 102 has a through bore 112 and the second member 108 has an aperture 114. Both, the through bore 112 and the aperture 114 have central axes 116 and 118 that are arranged coaxial to each other, as well as, parallel to a longitudinal axis 120 of the base member 106.

The aperture 114 of the second member 108 has two radially opposing stop members 122a and 122b protruding inwardly from an internal surface of the aperture 114. The through bore 112 is suitable to operably receive a predetermined screw or bolt.

A nut member 124 is operably coupled within the aperture 114, i.e. a threaded through bore 125 of the nut member 124 is coaxially aligned with the central axes 116 and 118 of the first and second member 102, 108. Further, the nut member 124 comprises two radially opposing block members 126a and 126b that are adapted to stoppingly engage with respective stop members 122a and 122b when the nut member 124 is rotated about its central axis 118 within the aperture 114. Before a first use, the nut member 124 is in a first position, where it is frangibly connected to the internal surface of the aperture 114. The frangible connection 127a, 127b (e.g. via two opposing frangible connectors) is broken when the nut member 124 is first rotated about its central axis 118 from the first position towards a second position, where each one of the block members 126a, 126b stoppingly engages with a respective stop member 122a, 122b of the aperture 114. It is understood by the person skilled in the art, that any suitable number of corresponding stop members 122a, 122b and/or block members 126a, 126b may be used to provide the intended interaction between the nut member 124 and the aperture 114 of the second member 108.

In this particular example, two parallely arranged resilient legs 128a, 128b are provided so as to biasingly protrude from the first member 102 into a receiving portion 130 and towards the second member 108. Here, each one of the resilient legs 128a, 128b is formed from a lateral portion of the first member 102 that are bent into the receiving portion 130 so as to extend from a top portion of the first member 102 toward a bottom portion of the second member 108, providing a declining sliding surface for a panel structure 202 that may be pushed into the receiving portion 130 of the fastener 100.

Referring now to FIGS. 3A to 3D, FIGS. 4A, 4B and FIGS. 5A to 5C, the fastener 100 is shown in a sequence when used to couple/attach two panel structures 200a, 200b together. Here, panel structure 200a is simply pushed into the receiving portion 130 sliding down the resilient legs 128a, 128b axially aligning a through hole of the panel structure 200a with the aperture 114 and, at the same time, bending the resilient legs 128a, 128b towards the first member 102. Once in position, the resilient legs biasingly engage with the panel structure 200a, pushing it towards the second member 108. A through hole of a second panel structure 200b is then aligned with the through bore 112 of the first member 102 and a screw or bolt 300 is pushed through the through hole of the second panel structure 200b, the through bore 112 and the through hole of the first panel structure 200a into screwing engagement with the nut member 124. When the screw or bolt 300 is screwed into the threaded through bore 125, the nut member 124 is pulled towards the first member 102 breaking the frangible connection 127a, 127b and slidingly rotating the block members 126a, 126b of the nut member 124 into engagement with the stop members 122a, 122b of the aperture 114. Once the nut member 124 is in this second position, further rotation of the screw or bolt 300 slidingly moves the nut member 124 towards (or away from) and into abutting engagement with the panel structure 200a (depending on direction of rotation of the screw or bolt 300). At this point, further tightening rotation of the screw or bolt 300 squeezes the two panel structures 200a, 200b and first member 102 together so as to form a tight connection between the panel structures 200a, 200b and the fastener 100. Also, in this position, the two lateral resilient legs 128a. 128b are aligned with the first member 102, i.e. sitting between the first and second panel structure 200a, 200b.

The nut member may further comprise a flange portion 132 adapted to abuttingly engage with a surface of the first panel structure 200a.

FIGS. 4A-4B and FIGS. 5A-5C show the fastener 100 of the first embodiment but coupled with one different panel structure 202b.

Referring now to FIGS. 6A to 8B, an alternative example embodiment 400 of the fastener of the present invention is shown. The alternative fastener 400 operates in substantially the same way as the fastener 100 of the first example embodiment, but with minor variations in the dimensions and the frangible connection between the nut member 424 and the aperture 414 of the second member 408. Further, the two resilient legs 428a, 428b have a different design and are formed from the base portion 406 extending from the second member 408 towards the first member 402. In addition, the frangible connection 427a, 427b is provided circumferentially offset (90 degrees) from the stop members 422a, 422b, whereas, in the first example embodiment 100, the frangible connection 127a, 127b (see FIGS. 2A-2D) is radially in line with the stop members 122a, 122b.

FIGS. 7A-7D show a sequence of coupling two panels 500a, 500b utilising the fastener 400 of the alternative embodiment. The sequence of operation is identical to the sequence used for the fastener 100 of the first embodiment.

Figure 8A:
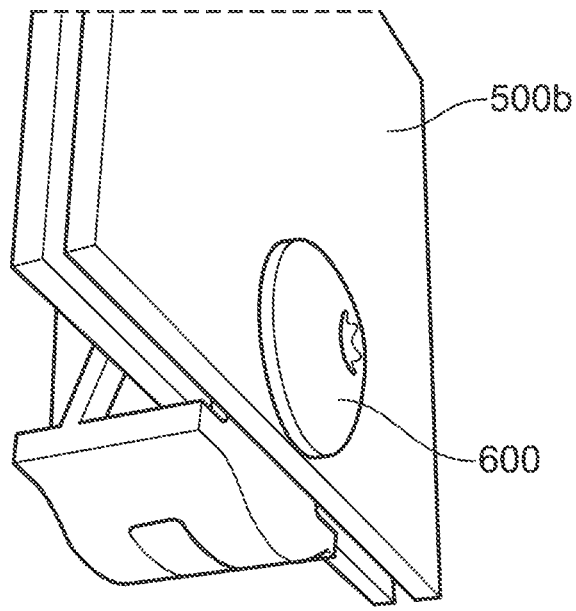
FIG. 8A shows a perspective front-view and FIG. 8B a perspective rear-view of the fastener of FIGS. 6A-6C coupled to two panel structures.
Figure 8B:
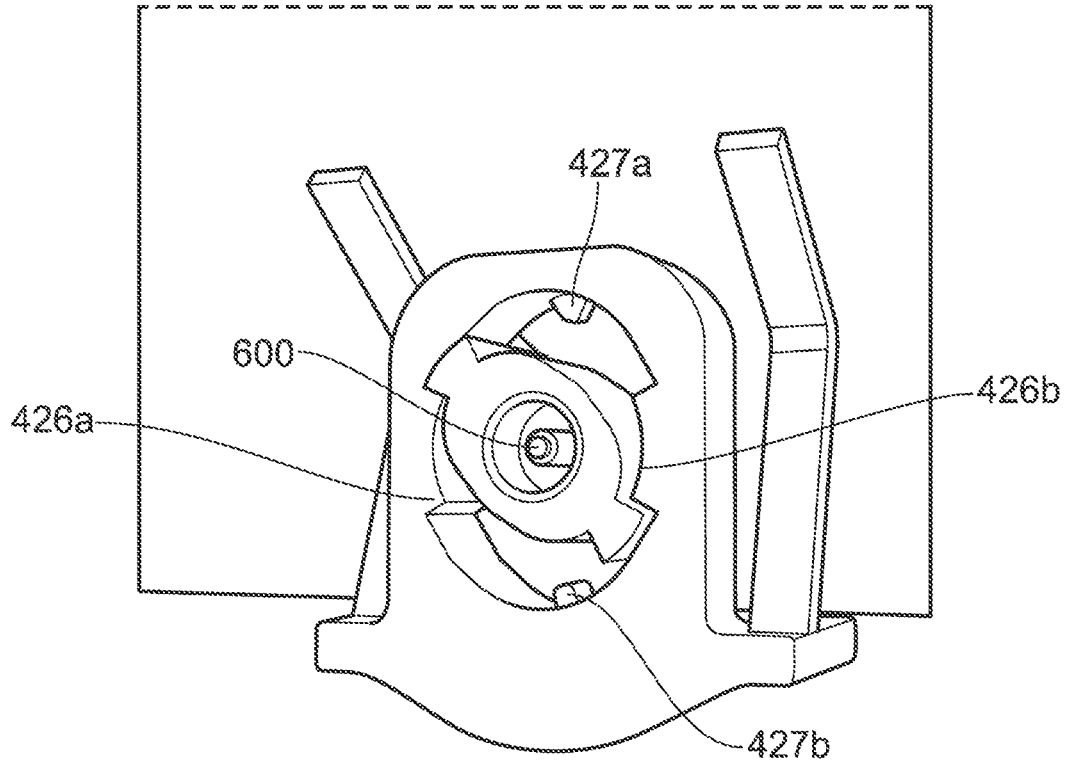

Once the first panel 500a and second panel 500b are in position and a screw or bolt 600 is inserted, the nut member 424 may be rotated on rotation of the screw or bolt 600. The direction of rotation can be seen from the arrow in FIGS. 7A-7D. The frangible connection, or frangible connectors 427a, 427b, not shown in FIGS. 7A-7D but shown in FIGS. 8A-8B, is broken on rotation of the nut member 424.

On rotation of the nut member 106 the block members 426a, 426b engage with the stop members 422a, 422b, preventing further rotation of the nut member 424. Further rotation of the screw or bolt 600 (in the direction as shown in FIGS. 7A-7D) causes the nut member 424 to be axially pulled towards the first panel structure 500a.

Thus, in using the fastener 100, 400 of the present embodiments, for example to attach two panels 200a, 200b or 500a, 500b of a car door, in the manufacture of a car, a first panel 200a, 500a may be inserted into the receiving portion 130, 430 of the fastener 100, 400, and a second panel 200b, 500b may be positioned at the proximal side of the first member 102, 402 of the fastener 100, 400. When the panels 200a, 200b or 500a, 500b are in position on the fastener 100, 400, a screw or bolt 300, 600, for example, a fastening screw, may be inserted. A screw driver or similar tool may be used to rotate the screw or bolt 300, 600. The screw driver or similar tool may assist in placing the screw or bolt 300, 600 through the panels 200a, 200b, 500a, 500b being attached and the first member 102, 402 of the fastener 100, 400 and to position the screw or bolt 300, 600 ready for insertion into the nut member 124, 424 or for partial insertion into the nut member 124, 424.

Thus, in this manner, for example, two panels 200a, 200b, 500a, 500b for a car door may be attached together. The fastener 100, 400 of the present invention being configured to enable panels of different thicknesses to be attached together and a wide range of panel thickness that can be used, alleviates the need to use a fastener of a different type.

It will be appreciated by persons skilled in the art that the above embodiment(s) have been described by way of example only and not in any limitative sense, and that various alterations and modifications are possible without departing from the scope of the invention as defined by the appended claims. Various modifications to the detailed designs as described above are possible, for example, variations may exist in shape, size, arrangement (i.e. a single unitary components or two separate components), assembly or the like.

What is claimed is:

1. A fastener for coupling two panel structures, comprising:
    a base member, having a proximal end portion and a distal end portion extending along a longitudinal axis;
    a first member, provided on said base member towards said proximal end portion, said first member comprising a through bore having a first central axis that is parallel to said longitudinal axis;
    a second member, provided on said base member towards said distal end portion and spaced apart from said first member so as to form a receiving portion configured to receive at least one panel structure, comprising an aperture defining an internal surface and having a second central axis that is coaxially aligned with said first central axis, said internal surface comprising at least one stop member protruding radially inwardly from said internal surface, and
    a nut member, coaxially aligned with and having a frangible connection to said internal surface of said aperture, comprising at least one block member protruding radially outward from an outer surface of said nut member and configured to stoppingly engage with said at least one stop member, and
    wherein, during use, said nut member is configured to move from a first position, where said nut is frangibly connected to said internal surface by the frangible connection, to a second position, where said at least one block member is abuttingly engaged with said at last one stop member so as to allow axial movement of said nut member within said aperture of said second member.

2. A fastener according to claim 1, wherein said first member and said second member are arranged perpendicular to said longitudinal axis of said base member.

3. A fastener according to claim 1, wherein said nut member is configured to rotate from said first position to said second position.

4. A fastener according to claim 1, further comprising at least one resilient leg provided on any one of said base member, said first member and said second member and arranged laterally with respect to said longitudinal axis and extending into said receiving portion, configured to biasingly engage with a panel structure received in said receiving portion.

5. A fastener according to claim 4, comprising at least two resilient legs, each one arranged laterally with respect to said longitudinal axis on opposing sides of said base portion.

6. A fastener according to claim 1, wherein the fastener is made from integrally molded plastic.

7. A fastener according to claim 1, wherein said nut member comprises a central threaded bore configured for operably engage with a screw.

8. A fastener according to claim 1, wherein said internal surface comprise at least two radially opposing stop members each one protruding radially inwardly from said internal surface.

9. A fastener according to claim 8, wherein said nut member comprises at least two block members each one protruding radially outward from said outer surface of said nut member and configured to stoppingly engage with a respective one of said at least two stop members.

10. A fastener according to claim 9, wherein said at least two block members are arranged radially opposite to each other.

11. A fastener according to claim 1, wherein the frangible connection is broken as the nut member is moved from the first position toward the second position.

* * * * *